United States Patent [19]

Oguchi et al.

[11] 4,212,837

[45] Jul. 15, 1980

[54] METHOD AND APPARATUS FOR FORMING SPHERICAL PARTICLES OF THERMOPLASTIC MATERIAL

[75] Inventors: Toshihiko Oguchi, Kawasaki; Ichiyoshi Saito, Tokyo; Tsuyoshi Ueno; Tsutomu Kubo, both of Yokohama, all of Japan

[73] Assignee: Tokyo Shibaura Electric Company, Limited, Kawasaki, Japan

[21] Appl. No.: 902,859

[22] Filed: May 4, 1978

[30] Foreign Application Priority Data

May 4, 1977 [JP] Japan .................................. 52-51514
May 14, 1977 [JP] Japan .................................. 52-55839
May 14, 1977 [JP] Japan .................................. 52-55840

[51] Int. Cl.² ............................................. B29C 23/00
[52] U.S. Cl. ........................................ 264/15; 264/12
[58] Field of Search ................................. 264/15, 12

[56] References Cited

U.S. PATENT DOCUMENTS

| 2,976,574 | 3/1961 | Keutgen | 264/15 |
| 3,290,723 | 12/1966 | Jacques et al. | 264/15 |
| 3,639,245 | 2/1972 | Nelson | 252/62.1 |

Primary Examiner—Donald J. Arnold
Assistant Examiner—James R. Hall
Attorney, Agent, or Firm—Oblon, Fisher, Spivak, McClelland & Maier

[57] ABSTRACT

This invention is concerned with a method for forming spherical particles of thermoplastic material, characterized by the step of blowing a stream of gas having thermoplastic particles dispersed therein from a peripheral region into a jet of pressurized hot gas to form the thermoplastic particles into uniform spherical particles. It also provides apparatus for carrying out the foregoing method which includes means for discharging a jet of pressurized hot gas from an outlet port and means for ejecting a stream of gas having thermoplastic particles dispersed therein from the periphery of the outlet port toward the jet of pressurized hot gas.

12 Claims, 10 Drawing Figures

θ ≤ 80°

METHOD AND APPARATUS FOR FORMING SPHERICAL PARTICLES OF THERMOPLASTIC MATERIAL

BACKGROUND OF THE INVENTION

This invention relates to a method for forming spherical particles of thermoplastic materials having relatively low-melting points, such as natural resins, synthetic resins, and the like, and also to apparatus for carrying out the same method.

Conventionally, a number of methods for forming spherical particles of thermoplastic materials have been available. They include dry processes in which thermoplastic particles are either suspended in a hot atmosphere for a predetermined period of time so as to form a fluidized bed or dropped into a heated tube, and wet processes in which a solute dispersed or dissolved in water or an organic solvent is sprayed in a hot atmosphere to evaporate the solvent and thereby obtaining spherical solute particles.

In the aforesaid dry processes, however, it is difficult to keep the particles in the specified heating space for a desired period of time under an individually separate condition. Especially when the particles are not greater than 100 μm in diameter, they tend to fuse together into an agglomerate and/or stick to the vessel walls during the operation for forming them into spherical particles, resulting in a non-uniform degree of sphericity and an unduly decreased yield.

On the other hand, the wet processes (for example, the spray drying process) have the advantage of producing uniformly spherical particles over a wide range of particle diameter extending from several micrometers to several hundred micrometers. However, the solvent present in the sprayed particles must be evaporated almost completely before they can be collected. This poses the problems of requiring an immense drying space and hence an oversized apparatus; causing an increase of incidental facilities (due to the need for recovering the solvent) if the evaporated solvent is other than water; and involving risks of fire, toxicity, and the like.

SUMMARY OF THE INVENTION

This invention has been made for the purpose of overcoming the disadvantages of prior art methods as described above.

Accordingly, it is an object of this invention to provide a method for forming spherical particles of thermoplastic material which method can produce a good yield of uniform thermoplastic particles exhibiting a high degree of sphericity and can effect a reduction in size of apparatus and a simplification of operation.

It is another object of this invention to provide apparatus for carrying out the foregoing method.

In accordance with this invention, there is provided a method for forming spherical particles of thermoplastic material which comprises the steps of blowing a stream of gas having thermoplastic particles dispersed therein from a peripheral region into a jet of pressurized hot gas to melt and form spherical particles of thermoplastic material, and then cooling the spherical particles. In addition, there is also provided apparatus for forming spherical particles of thermoplastic material which includes means for discharging a jet of pressurized hot gas from an outlet port and means for ejecting a stream of gas having thermoplastic particles dispersed therein from at least one opening toward the jet of pressurized hot gas, the opening being spaced from the outlet port so as to provide a gap for permitting the flow of cooling air through the periphery of the outlet port.

DETAILED DESCRIPTION OF THE PREFERRED EMBODIMENTS

This invention will hereinafter be described with reference to the embodiments thereof illustrated in the accompanying drawings.

Figure 1:
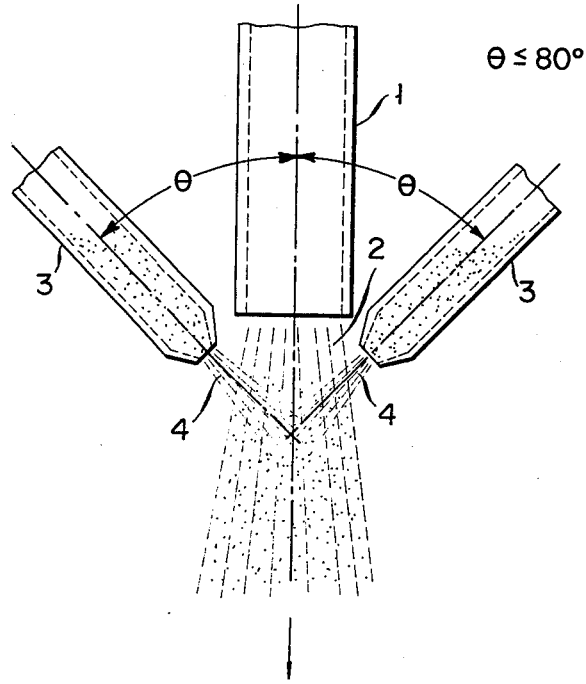
FIG. 1 is a side view of the essential part of an apparatus for carrying out the method of the invention.

Referring first to FIG. 1, there is shown a feed tube 1 for discharging a jet 2 of pressurized hot gas. In its periphery, for example, a pair of opposed nozzles 3 are disposed with their orifices facing obliquely downward. Each of these nozzles 3 serves to blow a stream 4 of gas having thermoplastic particles dispersed therein (hereinafter referred to as "stream of dispersed thermoplastic particles") into the jet 2 of pressurized hot gas, and has its open end located under the open end of feed tube 1 but set aside so as to prevent its exposure to the jet 2 of pressurized hot gas. When a jet 2 of pressurized hot gas is discharged from feed tube 1 and, at the same time, a stream 4 of dispersed thermoplastic particles is ejected from each nozzle 3, they creates a negative pressure which causes ambient air to be drawn through the gap between the open end of feed tube 1 and the open ends of nozzles 3. This flow of air serves to block effectively the conduction of heat from the jet 2 of pressurized hot gas to the tips of nozzles 3 and simultaneously cool the latter. The thermoplastic particles present in streams 4 are softened upon contact with the jet 2 of pressurized hot gas and formed into spherical particles. These spherical particles fall downward as they are cooled and solidified.

Most commonly, the jet of pressurized hot gas used in the practice of the invention consists of compressed and heated air. However, where the thermoplastic particles to be treated are unstable, for example, under oxidizing conditions, it is desirable to use a compressed and heated inert gas such as nitrogen. In addition, the temperature of the jet of pressurized hot gas should be sufficiently high to soften the thermoplastic particles in a very short period of time after they are brought into contact with the jet of pressurized hot gas. Usually, it is set at a value which is at least 100° C. higher than the softening point of the thermoplastic particles.

The stream of dispersed thermoplastic particles used in the practice of the invention means a stream of gas in which thermoplastic particles alone are dispersed to form a suspension. The diameter of the thermoplastic particles is usually not greater than 100 μm. The concentration of the thermoplastic particles present in the stream may vary according to the diameter thereof. However, it is generally not higher than 2 kg/cm$^3$ and preferably in the range of 50 to 1000 g/m$^3$. The reason why such limits are imposed on the concentration of the thermoplastic particles is that, if the concentration is higher than 2 kg/m$^3$, the particles softened in the jet of pressurized hot gas tend to fuse together into an agglomerate. Specific examples of the aforesaid thermoplastic particles include thermoplastic resin particles consisting essentially of natural resins such as rosin, copal, and shellac or synthetic resins such as solid paraffin, polystyrene, acrylic resin, polyethylene, polyvinyl chloride, polyamide, alkyd resin, phenolic resin, polycarbonate, epoxy resin, polyvinyl acetate, and blends or copolymers thereof; dye or pigment particles capable of being melted by heating; ceramic and metallic particles having a relatively low melting point; particles of organic materials such as sugar and pitch; sulfur particles; particles of fertilizer such as ammonium sulfate and the like.

The flow velocities of the jet of pressurized hot gas and the stream of dispersed thermoplastic particles used in the practice of the invention may be suitably determined depending on the temperature of pressurized hot gas, the softening point of the thermoplastic particles, and the size (or specific surface area) of the thermoplastic particles. More specifically, if the temperature of the jet of pressurized hot gas is substantially higher than the softening point of the thermoplastic particles to be treated, the flow velocities of the jet of pressurized hot gas and the stream of dispersed thermoplastic particles may be determined at higher levels because a short time of contact with the jet of pressurized hot gas is sufficient to form the thermoplastic particles into satisfactorily spherical granules. On the other hand, if the temperature of the jet of pressurized hot gas is not so much higher than the softening point of the thermoplastic particles to be treated, the flow velocities of the jet of pressurized hot gas and the stream of dispersed thermoplastic particles should be determined at lower levels because a relatively long time of contact with the jet of pressurized hot gas is required to form the thermoplastic particles into satisfactorily spherical granules. Similarly, if the diameter of the thermoplastic particles to be treated is small, the flow velocities of the jet of pressurized hot gas and the stream of dispersed thermoplastic particles may be determined at higher levels because a short time of contact is sufficient as described above. On the other hand, if the diameter of the thermoplastic particles to be treated is large, the flow velocities of the jet of pressurized hot gas and the stream of dispersed thermoplastic particles should be determined at lower levels because a relatively long time of contact is required as described above.

Generally, the flow velocity of the jet of pressurized hot gas is chosen in the range of 10 to 50 m/sec, and the flow velocity of the stream of dispersed thermoplastic particles is determined so that it is lower than that of the jet of pressurized hot gas.

Furthermore, the stream of dispersed thermoplastic particles is ejected in such a direction as to make an angle of not greater than 80°, and preferably 30° to 60°, with the jet of pressurized hot gas.

Now, specific examples of the means for feeding dispersed thermoplastic particles are described with reference to the accompanying drawings.

Figure 2:
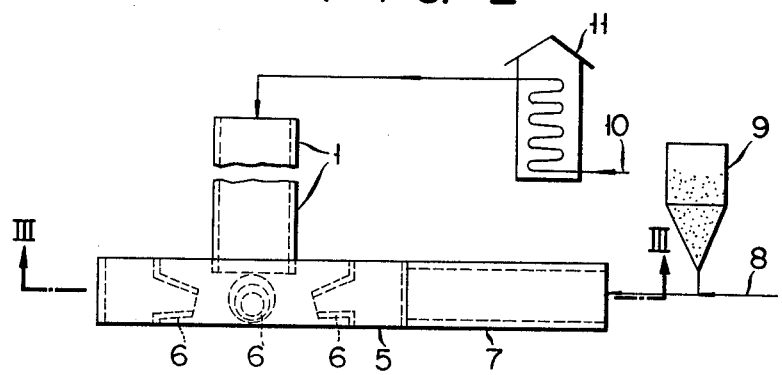
FIG. 2 is a schematic side view of an apparatus in accordance with another embodiment of the invention.
Figure 3:
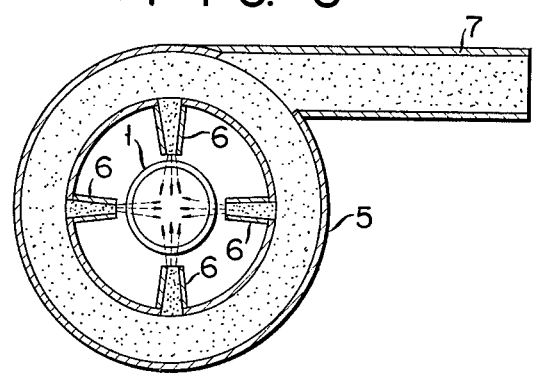
FIG. 3 is a sectional view taken along the line III—III of FIG. 2.

FIGS. 2 and 3 illustrate an exemplary apparatus for carrying out the method of the invention. There is shown a feed tube 1 for discharging a jet of pressurized hot gas, the open end of which is surrounded by a distributing ring 5 for dispersed thermoplastic particles. This distributing ring 5 is provided with four nozzles 6 at equal intervals, the nozzles 6 projecting in a centripetal and slightly downward direction. For the same purpose as described in connection with FIG. 1, the open ends of nozzles 6 are spaced from the open end of feed tube 1. More specifically, they are located under the open end of feed tube 1 but set aside so as to prevent their exposure to the jet of pressurized hot gas. In addition, an inlet pipe 7 is attached to one side of distributing ring 5 so that they are in flow communication with each other. Thus, the thermoplastic particles fed from a hopper 9 are dispersed in the compressed air flowing through a pipe line 8 and introduced into the distributing ring 5.

With this arrangement, compressed air is fed from a pipe line 10, heated by passing it through a heat exchanger 11, and introduced into the feed tube 1, whereby a jet of pressurized hot gas is provided. At the same time, a total of four streams of dispersed thermoplastic particles are ejected from four nozzles 6 and blown into the jet of pressurized hot gas.

Figure 4:
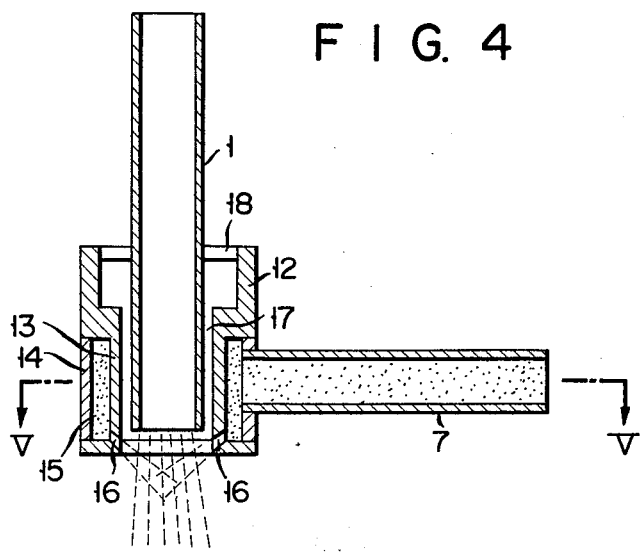
FIG. 4 is a sectional view of the essential part of an apparatus in accordance with a further embodiment of the invention.
Figure 5:
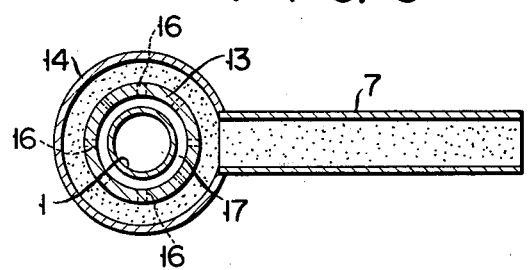
FIG. 5 is a sectional view taken along the line V—V of FIG. 4.

FIGS. 4 and 5 present another example of the means for feeding dispersed thermoplastic particles. In this embodiment, a double-walled tube 12 is employed as the means for distributing and feeding dispersed thermoplastic particles. More specifically, an annular passageway 15 is defined by its inner wall 13 and outer wall 14, and a plurality of openings 16 facing obliquely downward are provided in the lower part of inner wall 13. Similarly to the embodiment illustrated in FIG. 2, an inlet pipe 9 for introducing dispersed thermoplastic particles is provided in flow communication with the annular passageway 15. A feed tube 1 for discharging a jet of pressurized hot gas is so arranged that its open end is located slightly above the openings 16. For the same purpose as described above, a gap 17 is provided between the open end of feed tube 1 and the openings 16 so that cooling air may be supplied from the upper open end 18 of double-walled tube 12. The behavior of the jet of pressurized hot gas and the streams of dispersed thermoplastic particles is as described above in connection with the preceding embodiment.

In the above-described embodiments, the jet of pressurized hot gas is discharged from a tubular member having an opening of circular cross section. However, it is also possible to discharge the jet of pressurized hot gas radially from a feed tube.

Figure 6:
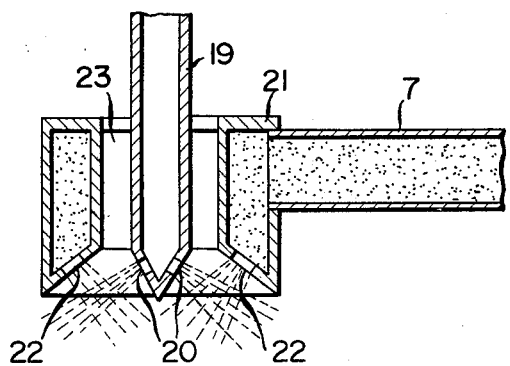
FIG. 6 is a sectional view of the essential part of an apparatus in accordance with a still further embodiment of the invention.

This arrangement is exemplified by the embodiment illustrated in FIG. 6. The feed tube 19 for discharging a jet of pressurized hot gas has a lower end of conical shape, and a plurality of radially arranged openings 20 are provided in the surface of the tapered end. On the other hand, the distributing ring 21 for feeding dispersed thermoplastic has a double-walled tubular construction similar to that illustrated in FIGS. 4 and 5, but its lower end is tapered. In the inner wall of the tapered end are provided a plurality of openings 22 corresponding to the aforesaid openings 20. With this arrangement, while the jet of pressurized hot gas is discharged radially from the openings 20 of feed tube 19, the dispersed thermoplastic particles introduced into the aforesaid distributing ring 21 by way of an inlet pipe are ejected from the openings 22 toward the jet of pressurized hot gas, whereby the thermoplastic particles are formed into globular bodies. As described in connection with FIG. 4, cooling air is supplied through the gap 23 formed between the distributing ring 21 and the feed tube 19. Thus, the lower end of distributing ring 21 is cooled so as to prevent its openings from clogging.

Figure 7:
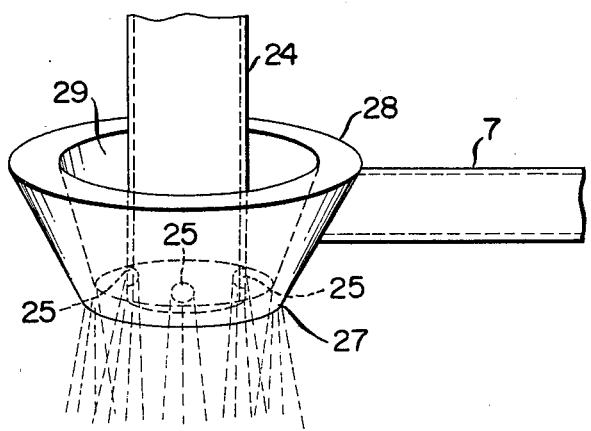
FIG. 7 is a perspective view of the essential part of an apparatus in accordance with a still further embodiment of the invention.

FIG. 7 illustrates a modified embodiment in which the jet of pressurized hot gas is discharged radially from a feed tube and, at the same time, the stream of dispersed thermoplastic particles is ejected in the form of a filmy current and blown into the jet of pressurized hot gas. More specifically, the feed tube 24 for discharging a jet of pressurized hot gas comprises a closed-end cylindrical member provided with a plurality of radially arranged openings 25 in the side wall of the lower end, which is surrounded by a cuplike distributing ring 28 having an annular slit 27 at the bottom. The dispersed thermoplastic particles introduced into the distributing ring 28 by way of an inlet pipe 7 are ejected from the slit 27 in the form of a filmy current and blown into the jet of pressurized hot gas, whereby the thermoplastic particles are formed into globular bodies. Similarly to the embodiment illustrated in FIG. 6, a gap 29 is provided between the distributing ring 28 and the feed tube 24 so as to permit the flow of cooling air.

Figure 8:
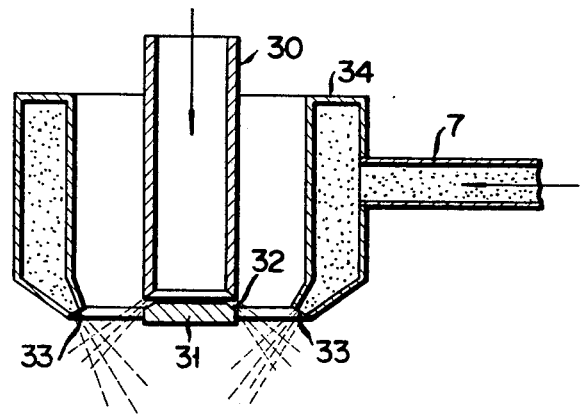
FIG. 8 is a sectional view of the essential part of an apparatus in accordance with a still further embodiment of the invention.

FIG. 8 illustrates another modified embodiment in which the stream of dispersed thermoplastic particles is ejected in the form of a filmy current (as in FIG. 7) and, at the same time, the jet of pressurized hot gas is also discharged in the form of a filmy current. More specifically, the feed tube 30 for discharging a jet of pressurized hot air comprises a cylindrical member having an internally tapered open end. Upon this open end is arranged a beveled plate 31 with a desired space therebetween. Thus, an annular slit 32 is formed between the tapered open end of feed tube 30 and the bevel of plate 31, and the jet of pressurized hot gas is discharged from this slit 32 in the form of a diverging filmy current.

On the other hand, the distributing ring for feeding dispersed thermoplastic particles is similar to that of FIG. 7. More specifically, the feed tube 30 is surrounded by a distributing ring 34 of double-walled tubular construction having an annular slit 33 at the bottom. With this arrangement, the dispersed thermoplastic particles introduced into the distributing ring 34 by way of an inlet pipe are ejected from the slit 33 in the form of a converging filmy current. Meanwhile, the jet of pressurized hot gas strikes against the plate 31 which is spaced from the open end of feed tube 30 to form the slit 32. As a result, it is discharged from the slit 32 in the form of a diverging filmy current and brought into contact with the converging filmy current of dispersed thermoplastic particles, whereby the thermoplastic particles are heated and formed into spherical granules. Similarly to the embodiment illustrated in FIG. 7, a gap is provided between the distributing ring 34 and the feed tube 30 so as to permit the flow of cooling air.

Figure 9:
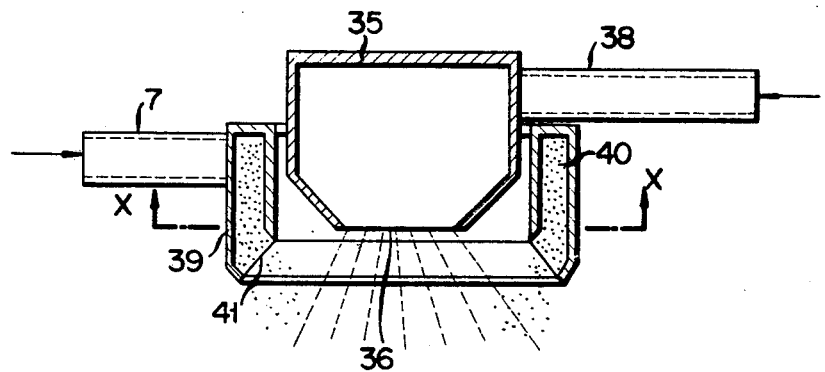
FIG. 9 is a sectional view of the essential part of an apparatus in accordance with a still further embodiment of the invention.
Figure 10:
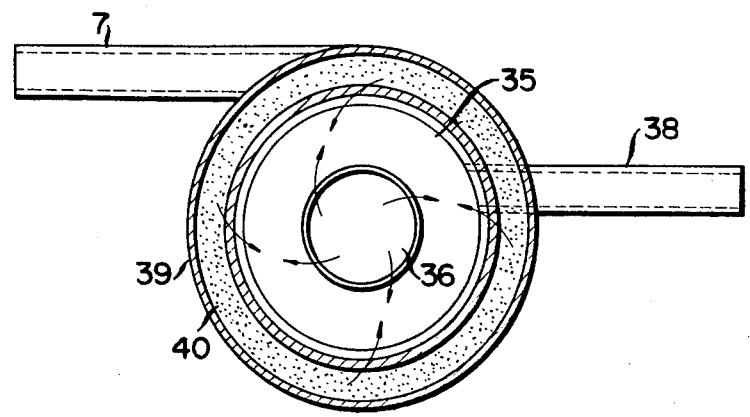
FIG. 10 is a sectional view taken along the line X—X of FIG. 9.

FIGS. 9 and 10 illustrate still another embodiment in which the jet of pressurized hot gas and the stream of dispersed thermoplastic particles are both discharged in the form of eddies so that they dash against and mix with each other. More specifically, as illustrated in FIG. 9, the tapered open end 36 of a feed chamber 35 for discharging a jet of pressurized hot gas is surrounded by a distributing ring 35 of double-walled tubular construction. Although the aforesaid arrangement is similar to that of FIG. 8, this embodiment is further characterized in that, as illustrated in FIG. 10, an inlet pipe 38 is attached tangentially to one side of feed chamber 35 and an inlet pipe 7 is attached tangentially to one side of distributing ring 39. Thus, the pressurized hot gas introduced into feed chamber 35 by way of the inlet pipe 38 is rotated along the wall of feed chamber 35 and then discharged from an open end 36 in the form of a diverging and eddying filmy current. On the other hand, the dispersed thermoplastic particles introduced into the distributing ring 39 by way of the inlet pipe 7 are rotated within the annular passageway 40 of distributing ring 39 and then ejected from an annular opening 41 facing slightly inward in the form of a converging and eddying filmy current. As is evident from FIG. 10, the filmy currents of pressurized hot gas and of dispersed thermoplastic particles are preferably caused to eddy in opposite directions so that these filmy currents may exhibit a higher efficiency of contact with each other and the thermoplastic particles may become easier to melt and form into spherical granules. Although the filmy currents of pressurized hot gas and of dispersed thermoplastic particles are both caused to eddy in this embodiment, it is also possible to discharge only one of them in the form of an eddy. Similarly to the preceding embodiments, a gap is again provided between the feed chamber 35 and the distributing ring 39 so as to permit the flow of cooling air.

According to the method of the invention, a stream of dispersed thermoplastic particles is blown into a jet of pressurized hot gas. As a result, the thermoplastic particles are heated in the jet of pressurized hot gas, they are softened uniformly because the stream of dispersed thermoplastic particles dashes against the jet of pressurized hot gas and vice versa, and the softened surface layer of the thermoplastic particles are subjected to surface tension, whereby uniformly spherical granules are produced with ease. Furthermore, the particles which have been formed into spherical granules are kept in the dispersed state and forcedly transferred to a cooling zone by the action of the jet of pressurized hot gas.

Accordingly, the present invention can bring about a variety of effects as described below:

(1) A large volume of uniformly spherical particles exhibiting an exceptionally high degree of sphericity can be produced in a short period of time.

(2) During the operation, the particles can be prevented from fusing together into an agglomerate and sticking to the vessel walls of the apparatus, whereby an improvement in production efficiency and a simplification of operation can be effected.

(3) As compared with prior art wet processes, much higher particle concentrations may be employed during the operation. This enables one to employ a substantially smaller space for the purpose of forming spherical particles of thermoplastic materials and thereby achieve a remarkable improvement in thermal efficiency.

(4) The apparatus for forming spherical particles of thermoplastic materials in accordance with the present invention are smaller in size and simpler in operation than those employed for carrying out prior art wet and dry processes.

In order to further illustrate the practice of the invention, the following examples are given.

EXAMPLE 1

As illustrated in FIGS. 2 and 3, compressed air was fed from a pipe line 10 and heated to 400° C. by passing it through a heat exchanger 11. Thereafter, it was introduced into a feed tube 1 and discharged from its open end (15 mm in diameter) to provide a jet of pressurized hot air having a pressure of 0.3 kg/cm$^2$.

On the other hand, 90 parts by weight of an expoxy resin (having a melting point of 130° C.) and 10 parts by weight of carbon black were hot milled, ground, and classified to produce black toner particles (thermoplastic particles) having an average diameter of 20 μm. These particles were fed from a hopper 9 to a pipe line 8 through which compressed air having a pressure of 0.3 kg/cm$^2$ was flowing, introduced into a distributing ring 5, and then ejected from four nozzles 6 (with an orifice diameter of 4 mm) provided thereon. Thus, a total of four streams of dispersed black toner particles having a particle concentration of 300 g/m$^3$ were blown into the aforesaid jet of pressurized hot air (having a temperature of 400° C.) to form the black toner particles into spherical particles.

Most of the black toner particles thus obtained were spherical exhibiting an exceptionally high degree of sphericity. Moreover, no agglomeration of the particles was noted.

EXAMPLE 2

As illustrated in FIGS. 4 and 5, a jet of pressurized hot air having a pressure of 0.2 kg/cm$^2$ and a temperature of 500° C. was discharged from a feed tube 1 (with an orifice diameter of 25 mm).

On the other hand, opoxy resin particles (thermoplastic particles) having an average diameter of 10 μm and a melting point of 130° C. were dispersed in compressed air having a pressure of 0.2 kg/cm$^2$, introduced into a distributing ring 12 whose lower half had a double-walled tubular construction, and then ejected from eight openings 16 (3 mm in diameter) provided symmetrically in the lowermost part of the inner wall of distributing ring 12. Thus, a total of eight streams of dispersed epoxy resin particles having a particle concentration of 100 g/m$^3$ were blown into the aforesaid jet of pressurized hot air (having a temperature of 500° C.) to form the epoxy resin particles into spherical granules.

Just as in Example 1, most of the epoxy resin particles thus obtained were spherical exhibiting an exceptionally high degree of sphericity. Moreover, no agglomeration of the particles was noted.

EXAMPLE 3

Employing an apparatus as illustrated in FIGS. 9 and 10, compressed air was heated to 400° C. by passing it through a heat exchanger and then introduced tangentially through an inlet pipe 38 into a feed chamber 35 of hollow cylindrical shape. As a result, it was rotated within the feed chamber 35 and then discharged from an opening 36 at a flow velocity of 30 m/sec in the form of a diverging and eddying filmy current.

On the other hand, expoxy resin particles having an average diameter of 10 μm and a melting temperature of 140° C. was fed from a hopper to a Venturi pipe through which compressed air was flowing. The particles thus dispersed in compressed air was introduced through an inlet pipe 7 into a distributing ring 39, rotated within it, and then ejected from its annular opening 41 at a flow velocity of 15 m/sec in the form of a converging and oppositely eddying filmy current. Thus, the filmy current of dispersed epoxy resin particles having a particle concentration of 400 g/m$^3$ was blown into the filmy current of compressed hot air (having a temperature of 400° C.).

Approximately 100% of the epoxy resin particles thus obtained were spherical, exhibiting an exceptionally high degree of sphericity. Moreover, no agglomeration of the particles was noted.

EXAMPLE 4

Employing an apparatus similar to that of FIG. 3, compressed air (having a pressure of 0.4 kg/cm$^2$) was heated to about 500° C., introduced through an inlet pipe 38 into a feed chamber 35, and then discharged from an open end 36 in the form of a divergently extending and eddying film.

On the other hand, 80 parts by weight of a styrene resin (having a melting point of 150° C.) and 20 parts by weight of carbon black were hot milled, ground, and classified to produce black toner particles having an average diameter of 20 μm. These particles were dispersed in compressed air (having a pressure of 4 kg/cm$^2$), introduced into a distributing ring 39 by way of an inlet pipe 7 attached tangentially thereto, and then ejected from its annular opening 41 in the form of a converging and oppositely eddying filmy current. Thus, the filmy current of dispersed black toner particles having a particle concentration of 600 g/m$^3$ was blown into the filmy current of compressed hot air (having a temperature of 500° C.).

Microscopic examination revealed that the black toner particles thus obtained were spherical, exhibiting almost perfect sphericity. Moreover, no agglomeration of the particles was noted.

What is claimed is:

1. A method for forming spherical particles of thermo-plastic material comprising:
    (a) blowing a stream of gas containing therein thermoplastic particles having diameters not greater than 100 μm at a concentration of 2 kg/m$^3$ or less from a point adjacent to, and separated by a gap from, the circumference of a downwardly ejected-jet stream of pressurized hot gas into said jet stream and at an angle of 80° or less in relation to the direction of the hot gas stream, thereby melting the particles of the thermoplastic material into droplets only in said gas stream to cause the reformation of the shape of the individual droplets into substantially spherical form and;
    (b) immediately cooling said reformed thermoplastic droplets to a temperature below their melting point and in their reformed shape by means of cooling air drawn downwards through said gap between the jet stream of the hot gas and the stream of thermoplastic particles, and by means of ambient air, thereby solidifying said reformed thermoplastic droplets.

2. The method of claim 1 wherein said stream of gas containing thermoplastic particles is blown from a source not located in the path of said jet stream whereby said thermoplastic particles are not melted at said source.

3. The method of claim 1 wherein the temperature of the jet of pressurized hot gas is at least 100° C. higher than the softening point of the thermoplastic particles.

4. The method of claim 1 wherein the jet of pressurized hot gas consists of a gas inert to the thermoplastic particles.

5. The method of claim 1 wherein the flow velocity of the jet of pressurized hot gas is in the range of 10 to 50 m/sec and the flow velocity of the stream of gas having thermoplastic particles dispersed therein is lower than that of the jet of pressurized hot gas.

6. The method of claim 1 wherein a plurality of streams of gas having thermoplastic particles dispersed therein is blown from a plurality of peripheral positions into the jet of pressurized hot gas.

7. The method of claim 1 wherein the stream of gas having thermoplastic particles dispersed therein is discharged in the form of a filmy current and blown into the jet of pressurized hot gas.

8. The method of claim 1 wherein the jet of pressurized hot gas is discharged in the form of a diverging filmy current.

9. The method of claim 1 wherein the jet of pressurized hot gas and the stream of gas having thermoplastic particles dispersed therein are each discharged in the form of a filmy current.

10. The method of claim 1 wherein the stream of gas having thermoplastic particles dispersed therein is discharged in the form of an eddy.

11. The method of claim 1 wherein both the jet of pressurized hot gas and the stream of gas having thermoplastic particles dispersed therein are discharged in the form of eddies.

12. The method of claim 1 wherein the jet of pressurized hot gas is discharged in the form of eddies.

* * * * *